Oct. 19, 1926.
J. M. STEELE
1,603,561
DUPLEX SPRING AND SHOCK ABSORBER
Filed April 21, 1925
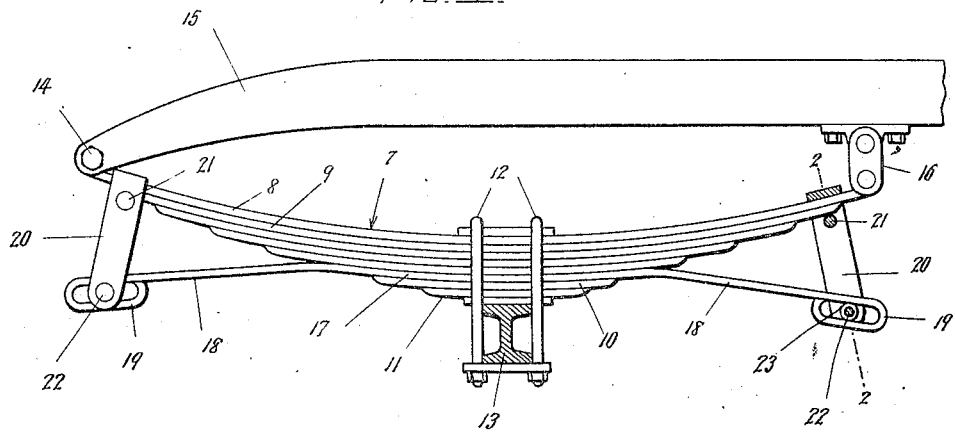
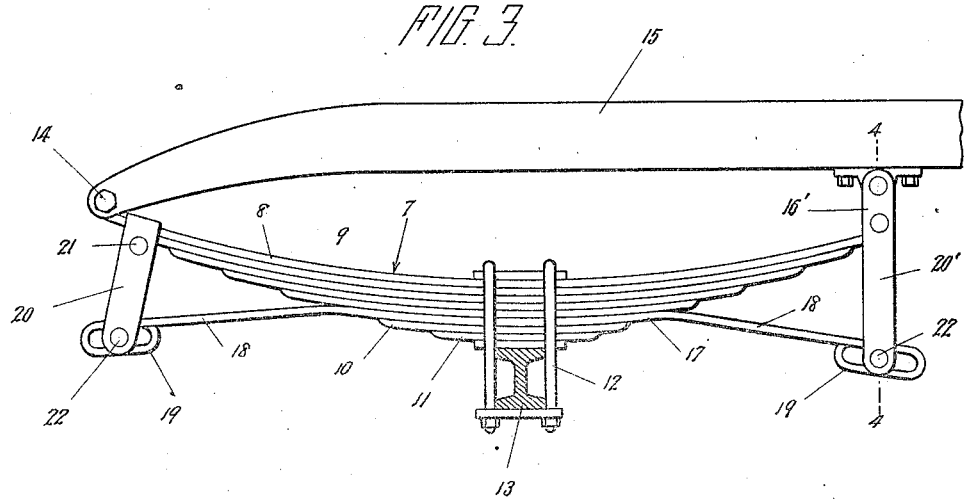
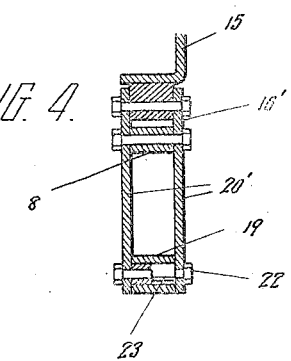
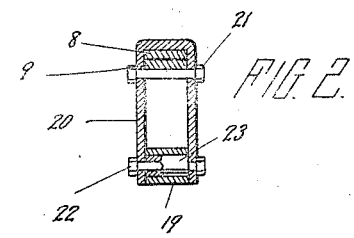
Inventor:
J. M. STEELE
By Monroe E. Miller
Attorney.

Patented Oct. 19, 1926.

1,603,561

UNITED STATES PATENT OFFICE.

JOSEPH M. STEELE, OF AKRON, OHIO.

DUPLEX SPRING AND SHOCK ABSORBER.

Application filed April 21, 1925. Serial No. 24,809.

The present invention relates to vehicle springs, and aims to provide a novel and improved duplex spring and shock absorber for use especially on automobiles and other motor vehicles.

Another object is the provision of a semi-elliptic laminated spring having one of its leaves extended and connected with the end portions of the spring to provide for a modified action of the spring, in order to absorb shocks and decrease the jolting and rebounding of the vehicle body.

It is also an object of the invention to provide a spring device of the kind indicated which is simple in construction, as well as practical and efficient, and which will not involve much expense in addition to the usual cost of a semi-elliptic laminated spring.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a side elevation of the improved spring, portions being broken away and shown in section.

Fig. 2 is a section on the line 2—2 of Fig. 1.

Fig. 3 is a side elevation illustrating a modification.

Fig. 4 is a section on the line 4—4 of Fig. 3.

Referring to Figs. 1 and 2, the semi-elliptic laminated spring 7 is of usual construction, with the exception of one of its leaves as hereinafter described, with its leaves decreasing in length, as usual, the longest leaf being indicated at 8, the next to the longest at 9, while the next to the shortest and the shortest leaves are indicated 10 and 11, respectively. The leaves are clamped together and the spring secured on an axle 13, by the usual clamp 12. One end of the longest leaf 8 is pivotally or hingedly connected, as at 14, to the frame 15 of the vehicle, while the opposite end of said leaf is connected to the frame through the medium of the usual shackle 16, permitting the last named end of the leaf 8 to move longitudinally slightly as the spring flexes. The spring 7 as described up to this point is of ordinary construction, and the improvements may be used with springs of the same kind having different means of connection with the frame, as will be apparent.

In carrying out the invention, one of the intermediate leaves of the spring 7 is extended. As shown, the third leaf from the bottom, indicated at 17, has its terminals extended, as at 18, and bent back to provide the terminal loops 19. Said leaf 17 is substantially as long as the leaf 8, and the terminal portions or extensions 18 extend angularly downward slightly below a horizontal line, while the terminals of the other leaves extend upwardly slightly according to the general curvature of the spring 7.

The terminals of the spring 17 are connected to the terminal portions of the leaf 8. Thus, inverted U-shaped shackles 20 straddle the leaves 8 and 9 near the ends of the spring 7, and are secured on said leaves by bolts 21 or other securing elements engaging through the arms of the shackles 20 under the leaf 9. Bolts 22 or other elements engage through the terminal portions of the shackles 20 and have rollers 23 thereon working loosely in the loops 19, with said loops extending through the shackles 20. This provides a sliding connection of the leaf 17 with the shackles 20.

In the normal position of the spring 7, with the normal weight imposed thereon, the end portions of the spring 7 are depressed slightly, thereby moving the spring 7 toward a straight line position, and the shackles 20 being depressed will bend down the terminals or extensions 18 of the leaf 17. This brings the leaf 17 under tension, and the rollers 23 bear on the bottom portions of the loops 19. Should the vehicle pass over an obstruction or rut so as to move the axle 13 and frame 15 toward one another, this action is resisted by the spring 7 and the leaf 17 jointly, the spring 7 moving further toward a straight line position, while the leaf 17 is moved or sprung further away from a straight line position. The leaf 17 thus assists in the cushioning action, and the leaves 10 and 11 being disposed under the intermediate portion of the leaf 17 will prevent the excessive bowing of the leaf 17. When the rebound occurs resulting in the frame 15 and axle 13 being separated, the leaf 17 serves to check such rebound. Thus, when the axle and frame are separated beyond their normal spaced relation, the leaf 17 assumes an intermediate non-tensioned position and its terminals or extensions 18 are then sprung or bent upwardly toward a straight line position, thereby bringing the leaf 17 under reverse or opposite tension to resist or check the rebound, with the rollers 23 contacting with the upper portions of the loops 19. The leaf 17 thus assists in the cushioning action when the axle and frame move toward one another, as well as checking the rebound action. This absorbs the shocks and reduces the jolting of the vehicle body.

Figs. 3 and 4 illustrate a modification, in that the shackle 16' between the spring 7 and frame 15 is extended, as at 20', and provided with the bolt 22 for the engagement of the corresponding loop 19 of the leaf 17, thereby combining both shackles at one end of the spring into one shackle.

Having thus described the invention, what is claimed as new is:—

1. A semi-elliptic laminated spring having curved leaves decreasing in length in succession with the exception of one leaf intermediate the longest and shortest leaves, said intermediate leaf having extended terminals bent away from the terminals of the longer leaves, and shackles connected to the end portions of the spring and to said terminals.

2. The combination with the frame and axle of a vehicle, of a semi-elliptic laminated spring secured between its ends on the axle and having its ends connected to the frame, for yieldingly mounting the frame on said axle, said spring having curved leaves decreasing in length in succession from the upper leaf downward with the exception of one leaf, the last named leaf having extended terminals bent away from the terminals of the longer leaves and provided with portions bent back downwardly, and shackles connected to the end portions of the upper leaf and having portions bearing on said bent back portions to spring said terminals downwardly when the frame and axle move toward one another.

In testimony whereof I hereunto affix my signature.

JOSEPH M. STEELE.